United States Patent [19]

Ito et al.

[11] Patent Number: 4,868,821
[45] Date of Patent: Sep. 19, 1989

[54] OPTICAL PICKUP WHICH INCLUDES A SINGLE OBJECTIVE LENS HAVING MAGNIFICATION EQUAL TO OR GREATER THAN 3 AND EQUAL TO OR SMALLER THAN 5

[75] Inventors: Masashi Ito, Osaka; Toshiki Matsuno, Takarazuka; Hiroyuki Nakamura, Kobe; Hiroshi Yasuda, Osaka, all of Japan

[73] Assignee: Matsushita Electric Industrial Co., Ltd., Japan

[21] Appl. No.: 144,462

[22] Filed: Jan. 19, 1988

Related U.S. Application Data

[63] Continuation of Ser. No. 711,570, filed as PCT JP84/00344 on Jul. 5, 1984, published as WO85/00457 on Jan. 31, 1985, abandoned.

[30] Foreign Application Priority Data

Jul. 6, 1983 [JP] Japan ................................ 58-122806
Jul. 6, 1983 [JP] Japan ................................ 58-122804

[51] Int. Cl.$^4$ ........................... G11B 7/00; G02B 9/00
[52] U.S. Cl. ................... 369/112; 369/110; 369/45; 369/118; 350/448; 250/201
[58] Field of Search ................ 369/112, 110, 45, 121, 369/118; 250/201 DF; 350/448, 449, 450

[56] References Cited

U.S. PATENT DOCUMENTS

| | | | |
|---|---|---|---|
| 4,027,952 | 6/1977 | Hughes | 369/112 |
| 4,333,173 | 6/1982 | Yonezawa et al. | 369/45 |
| 4,354,103 | 10/1982 | Immink et al. | 369/45 |
| 4,386,823 | 6/1983 | Musha | 369/45 |
| 4,411,500 | 10/1983 | Yonezawa et al. | 369/118 |
| 4,482,986 | 11/1984 | Noda et al. | 369/112 |
| 4,708,445 | 11/1987 | Goto | 350/450 |

FOREIGN PATENT DOCUMENTS

| | | |
|---|---|---|
| 2394106 | 1/1979 | France . |
| 2403575 | 4/1979 | France . |
| 0045171 | 3/1980 | Japan ............................ 369/122 |
| 56-156937 | 12/1981 | Japan . |
| 2006461 | 5/1979 | United Kingdom . |
| 0039836 | 11/1981 | United Kingdom . |
| 1603596 | 11/1981 | United Kingdom . |

OTHER PUBLICATIONS

Video Disc & Optical Memory Systems: Isailovic; ©1985 Prentice-Hall; pp. 188-189.

Primary Examiner—Alan Faber
Assistant Examiner—Hoa T. Nguyen
Attorney, Agent, or Firm—Lowe, Price, Leblanc, Becker & Shur

[57] ABSTRACT

The movable range of an objective of an optical pickup device used in optical disc reproducing apparatus is increased and the size of the device is reduced by moving the objective solely or in combination with a collimating lens system in that range. The objective and collimating lens systems are integrated into a lens holder and located in the path of a diverging beam of a semiconductor laser.

4 Claims, 3 Drawing Sheets

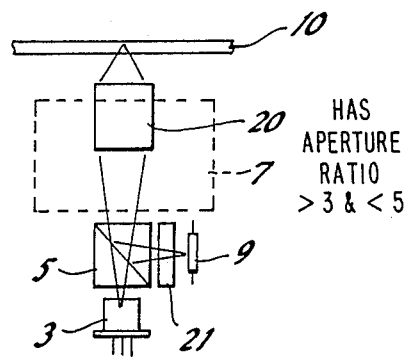
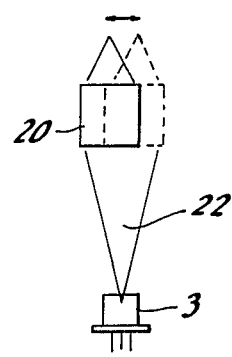
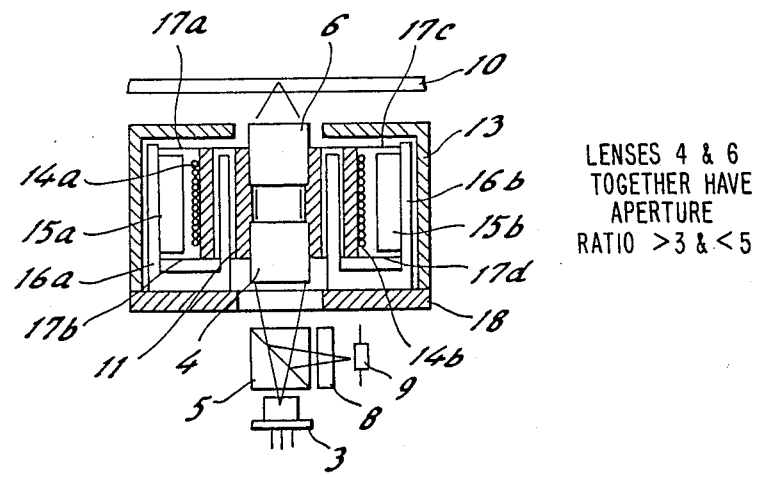

OPTICAL PICKUP WHICH INCLUDES A SINGLE OBJECTIVE LENS HAVING MAGNIFICATION EQUAL TO OR GREATER THAN 3 AND EQUAL TO OR SMALLER THAN 5

This application is a continuation of application Ser. No. 711,570, filed as PCT JP84/00344 on Jul. 5, 1984, published as WO85/00457 on Jan. 31, 1985, now abandoned.

FIELD OF THE INVENTION

The present invention relates to an optical pickup device for use in a reproducing apparatus of the type which optically picks up digital signals recorded at high density in a disc like recording medium (which will hereinafter be referred to as disc) by illuminating tracks with a light beam.

BACKGROUND OF THE INVENTION

Optical pickup devices are used for optical digital audio disc players or optical video disc players to reproduce information recorded on a disc. In the optical pickup of a digital audio disc player, a semiconductor laser is used as a light source to minimize the size and weight of the optical pickup.

Track following control methods are currently employed to eliminate errors due to warped discs, disc surface irregularities and eccentric tracks. In a first method, the optical pickup objective lens system 1 is moved in the direction of focus indicated by arrow F in FIG. 1 and in directions transverse to the tracks as indicated by arrow T. In a second method the objective lens system 1 is moved in focus direction F and the whole unit of pickup 2 including the laser, light sensor and the lens, is moved in the transverse direction T as shown in FIG. 2. In a third method, the whole unit 2 is moved in both the F and T directions.

Of these, the first and second methods have been employed extensively. In the conventional methods, including the third method, beams incident on the objective lens 1 must be parallel, to enable the objective lens 1 to be controlled in all directions without decreasing its optical performance; commercially available objective lenses are designed to fit parallel ray arrangements.

The following is a description of conventional optical pickups.

FIG. 4 is a side view of a conventional optical pickup including semiconductor laser 3, collimating lens 4, semitransparent mirror 5, objective lens 6, objective-lens drive unit 7, an error detecting optical system 8 for detecting focus error and tracking error, a light-receiving element 9, and a disc 10.

The operation of this optical pickup is as follows.

Light emitted, from the semiconductor laser 3 is collimated by the collimating lens 4 before reaching the objective 6 through the semitransparent mirror 5 and then focused on the disc 10. Light reflected onto disc 10 is collimated by lens 6 and is divided by the semitransparent mirror 5 into two beams, one of which is focused on the light-receiving element 9 by the error detecting optical system 8.

The objective lens 6 is controlled by the objective drive unit 7 in the focussing and tracking directions so that the track following control can be performed to minimize errors due to warped discs, eccentric tracks dr the like.

The collimating lens 4, shown in FIG. 5, is positioned between semitransparent mirror 5 and objective 6, resulting in a compact structure as compared with that shown in FIG. 4.

Since the distance between semiconductor 3 and collimating lens 4 and the distance between objective 6 and disc 10 are respectively determined by such factors as the focal length of the respective lenses, and the working distances to reduce the size of the optical system, it is necessary for the distance between collimating lens 4 and objective lens 6 to be as short as possible.

One possible solution is to reduce the height of the objective drive unit 7. However, because of the design limitations imposed on the maximum working distance of objective 6, as seen in FIG. 6, (which limits the allowable distance between it and disc 10), and because the distance between disc 10 and cover 13 and the distance between cover 13 and a lens holder 11 must be greater than the movable ranges of disc 10 and lens 6, lens 6 must extend upward from lens holder 11. This requires a balance weight 12 to be attached to the lower part of the lens holder to counter the weight of the lens 6 to ensure stability of the moving part of the unit, making it difficult to reduce the overall height of the unit. Further design considerations given to the stability and driving power of the unit necessarily result in a bulky structure, that is 15 mm to 20 mm high.

Illustrated in FIG. 6 are coils 14a and 14b magnets 15a and 15b and yokes 16a and 16b. These parts form a magnetic circuit for driving the objective 6. In the same drawings, members 17a, 17b, 17c and 17d support the moving part of the unit; base 18 is provided for the objective drive unit.

In conventional optical pickups described above, a costly collimating lens system is additionally required for collimating the diverging light rays emitted from semiconductor laser 3 in a manner shown in FIG. 7. This increases the total cost of the drive unit and the number of parts comprising the unit, resulting in a larger aberration of the whole system.

Furthermore, the collimating lens system 4 has a relatively long focal length, generally in the range from 14 mm to 17 mm. If this focal length is taken into account, the distance between laser 3 and disc 10 would inevitably become large and size reduction, particularly height reduction, would be impossible to achieve.

One prior attempt to achieve height reduction is shown in FIG. 8 in which a total-reflection prism 19 is provided in the path of a beam from laser 3 to objective 6. However, this increases the total aberration of the optical system and requires prism 19 to be adjusted in position to correct errors which might occur during assemblage and further requires the laser 3 to be adjusted in position for alignment purposes. Thus, the use of a prism is undesirable from the manufacturing standpoint.

A further disadvantage of conventional pickups is that objective lenses are designed for use with collimated light rays. Thereby, objective lens 1, FIG. 9, can only move in a range corresponding to the difference in diameter between it and collimating lens system 4. An increase in the diameter of collimating lens system 4, in an attempt to extend the movable range of lens 1, would result in a greater focal length and a larger numerical aperture.

DISCLOSURE OF THE INVENTION

The present invention provides an optical pickup which eliminates the problems encountered with conventional pickups by mounting an objective lens system or a lens holder holding it in a one-piece unit in the path of diverging light rays from a semiconductor laser.

Specifically, it is a first object of the present invention to reduce the aberration of a lens system by placing an objective lens in a diverging beam of a semiconductor laser without using a collimating lens, and to achieve cost and size reductions by increasing the movable range of the objective lens.

It is a second object of the present invention to achieve size reduction by mounting a lens system and a collimating lens system integrally as a one-piece unit in the lens holder of a drive unit and locating this one-piece unit in the path of a diverging beam of semiconductor laser 3 to thereby shorten the distance between the two lenses and to achieve reductions in cost and in the number of required parts by using the collimating lens system as a balance weight.

BRIEF DESCRIPTION OF DRAWINGS

FIG. 10 is a view of an optical pickup according to one embodiment of the present invention;

FIG. 11 is an illustration useful in describing the operation of the optical pickup according to this invention; and FIG. 12 is a sectional view of an optical pickup according to another embodiment of the present invention.

DESCRIPTION OF PREFERRED EMBODIMENT

Figure 1:
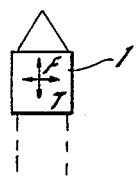
FIGS. 1 to 3 are illustrations useful for describing the operational principle of optical pickups.
Figure 2:
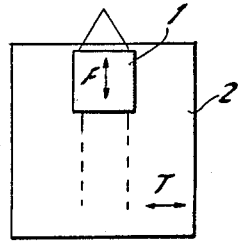
Figure 3:
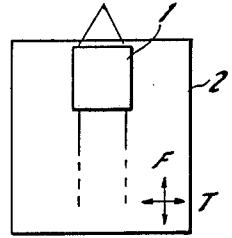
Figure 4:
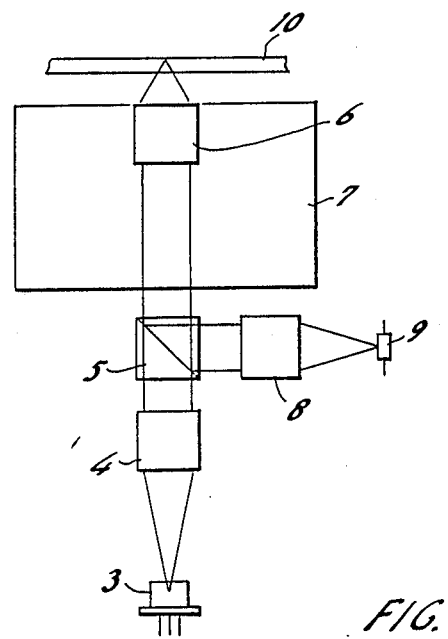
FIGS. 4 and 5 are illustrations of conventional optical pickups.
Figure 5:
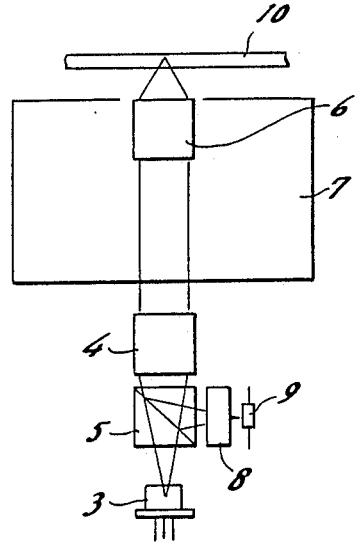

FIG. 10 is a drawing of the structure of an optical pickup according to an embodiment of the present invention. The pickup includes an objective lens 20 that is movably mounted in opposed relation to the surface of a disc, objective drive unit 7, a semitransparent mirror 5 for bending light reflected from the disc 10 to a light-receiving element 9, an error detecting optical system 21 for detecting focus error and tracking error, and a semiconductor laser 3 having the same structure as conventional laser.

The operation of the optical pickup according to the present invention is as follows.

A diverging beam emitted from the semiconductor laser 3 passes through the semitransparent mirror 5 to the objective lens 20 where it is focused to produce a microscopic light spot on the disc 10. Light reflected from the disc 10 is directed by the semitransparent mirror 5 and optical detecting system 8 so it is incident on the light-receiving element 9.

In this case, the beam spot is maintained in the focal plane by a servo-control mechanism; thereby, the reflected light returns to the incident optical path, irrespective of the position of objective 20, and forms a spot in a position conjugate with the position of semiconductor laser 3 with respect to the semitransparent mirror 5 to obtain normal signals.

The ratio of the numerical aperture of the objective lens system on the semiconductor laser side to the numerical aperture on the disc side, i.e., the magnification of the system, is varied somewhat when the objective 20 is moved in the direction of focus. If the magnification is too small, the variation would be substantial and therefore aberration occurs. On the other hand, if it is too large, the optical path between semiconductor 3 and disc 10 becomes longer, resulting in a bulky optical pickup. For an objective lens system having a movable range of ±1 mm (actual numerical values), the desirable magnification is 3 to 5 (semiconductor laser side < disc side).

Since the objective moves in a diverging beam as shown in FIG. 11, it is possible to increase its movable range compared with that of conventional devices.

Since a collimating lens is not used, the optical pickup of the invention is low cost, reduces aberration, allows a greater movable range for objective lens 20, and is compact in design, having a particularly low profile.

In this embodiment, semitransparent mirror 5 is provided between semiconductor laser 3 and objective 20; however, in place of the mirror, a combination of a polarization beam splitter and a quarter wavelength plate can be employed. Furthermore, in cases where a three-beam method is adopted for tracking control, a diffraction grating can be additionally used. In any modifications, since the distance between semiconductor laser and objective lens is constant the total length of the device remains unchanged.

FIG. 12 is an illustration of an optical pickup according to another embodiment of the present invention, wherein an objective and a collimating lens are integrally mounted in the diverging beam of a semiconductor laser.

Figure 6:
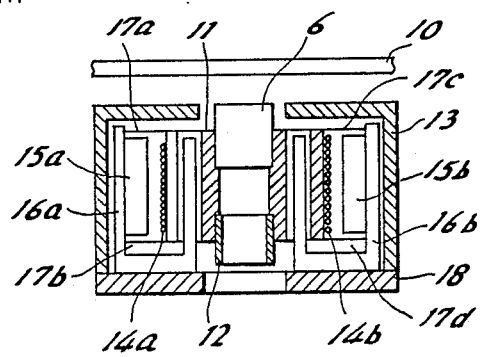
FIG. 6 is a sectional view of an objective drive unit of the conventional optical pickups.
Figure 7:
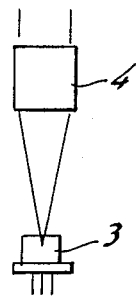
FIG. 7 is a drawing illustrating the relationship between a semiconductor laser and a collimating lens.
Figure 8:
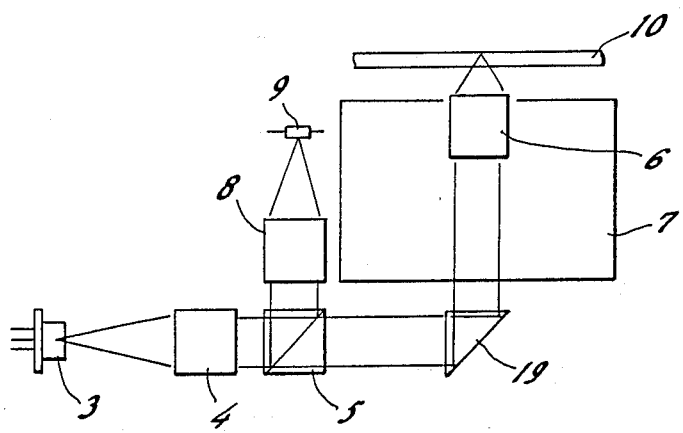
FIG. 8 is an illustration of another conventional optical pickup.
Figure 9:
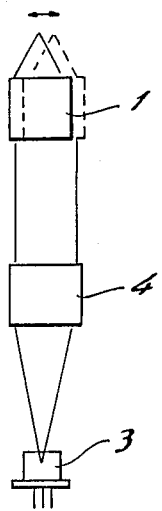
FIG. 9 is an illustration useful in describing the problem associated with the conventional optical pickups.

The structure of FIG. 12 includes an objective that is movably placed in opposed relation to a disc 10, lens holder 11 for holding the objective, and a collimating lens 4 fixedly secured on the lens holder. The description of the other parts which correspond to those of FIG. 6 are omitted for simplicity.

The operation of the optical pickup comprising the above-mentioned parts is as follows.

Light emitted from the semiconductor laser 3 is collimated by the collimating lens system 4 secured on the lens holder 11 after passing through semitransparent mirror 5 and then focused on the disc 10 by the objective 6. The reflected light from the disc 10 passes through the objective 6 and collimating lens 4. The beam is bent by the semitransparent mirror 5 to form a spot on the light-receiving element 9 of detecting optical system 8.

Since objective 6 and collimating lens 4 are fixedly secured on the lens holder 11, the distance between collimating lens 4 and objective 6 is shortened, resulting in a compact, low-profile optical pickup as in the previous embodiment. Therefore, optical pickups for use in, for example, automotive digital audio disc players can be realized without bending the light between semiconductor laser 3 and objective 6, permitting an increase in efficiency of the assembly.

Furthermore, in this embodiment, since the collimating lens 4 is positioned at a lower portion of lens holder 11, the center of gravity of the lens holder 11 is adjusted with respect to holding and drive members, without the balance weight required in conventional optical pickups, resulting in reduced parts.

APPLICATION FOR INDUSTRIES

Since an optical pickup according to the present invention, as described above, is arranged such that an objective, or a combination of objective and collimating lens systems, moves to diverge a semiconductor laser beam, it is possible to increase the movable range of objective and to reduce the size and profile of the optical pickup.

What is claimed is:

1. An optical pickup device for transducing encoded optical information on an optical track of a disc, comprising objective lens means mounted in opposed relation to the encoded information track, a semiconductor laser for emitting a diverging beam that is directed to be incident on the lens means and track, drive means for moving the lens means in directions parallel and transverse to a surface of said disc so the track is maintained within a sphere of the diverging beam emitted by the semiconductor laser, said lens means being arranged such that the magnification of the objective lens means is in a range such that it is equal to or greater than 3 and equal to or smaller than 5, the objective lens means consisting of a single objective lens having a first face positioned so the diverging beam from the laser is incident thereon and a second face positioned to transmit a focused beam resulting from the diverging beam incident on the first face onto the track, the first face having a lower numerical aperture value than the second face.

2. The optical pickup device of claim 1 wherein said means for moving includes an electromagnetic drive circuit.

3. The optical pickup device of claim 1 wherein the movable range of said objective lens means is ±one millimeter.

4. The optical pickup device of claim 1 wherein a direct beam path subsists between the laser and the track via the objective lens means and a reflected beam path subsists from the track through the lens means, further including a photodetector, and means positioned between the laser and the first face in the direct and reflected beam paths for directing the reflected beam away from the laser so that reflected beam is incident on the photodetector.

* * * * *